May 6, 1941.  W. LÜTY  2,241,312
MANUFACTURE OF LAMINATED FIBROUS ARTICLES
Filed Jan. 14, 1939
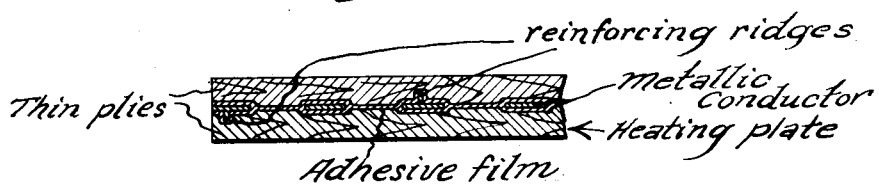
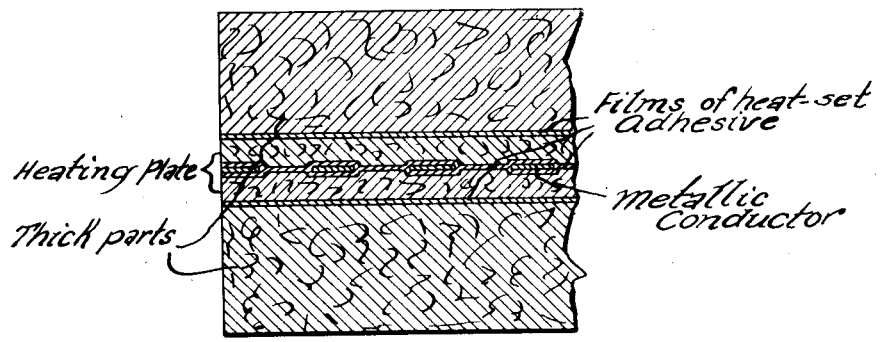
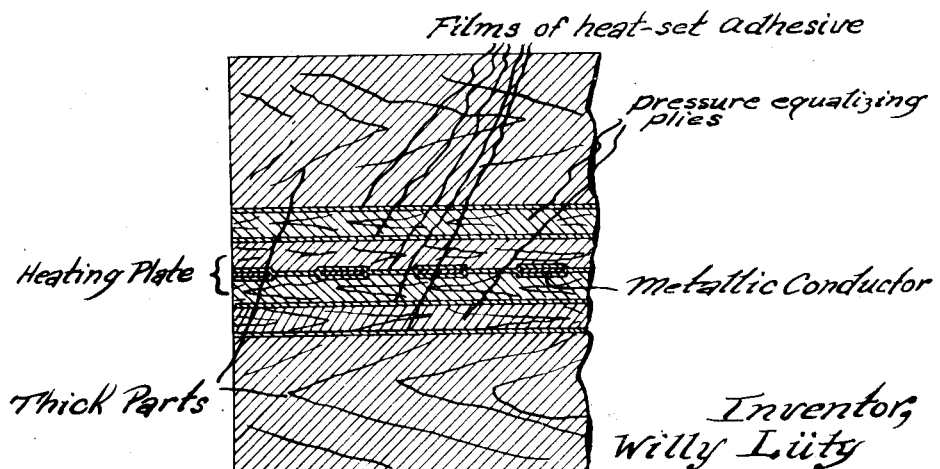
Inventor,
Willy Lüty
By: Henry C. Parker
Atty.

Patented May 6, 1941

2,241,312

UNITED STATES PATENT OFFICE 2,241,312

MANUFACTURE OF LAMINATED FIBROUS ARTICLES

Willy Lüty, Essen-Bredeney, Germany, assignor, by mesne assignments, to Th. Goldschmidt Corporation, New York, N. Y., a corporation of Delaware Application January 14, 1939, Serial No. 251,003 In Germany January 17, 1938

7 Claims. (Cl. 154—2)

This invention relates to manufacture of laminated fibrous articles; and it comprises a method of making compound lumber and other laminated articles from sheets of fibrous material some of which sheets may be of considerable thickness; said process comprising making a heating plate by placing a thin foraminous metallic conductor between thin sheets of fibrous material, such as wood veneers, for example, having a thickness at least about the double thickness of the metallic conductor, a heat-setting adhesive being present between said sheets and said metallic conductor, and uniting said sheets with said metallic conductor by the application of heat and pressure, then placing the resulting heating plate between plies of fibrous material to be united, at least one of said plies usually having a thickness too great for the penetration therethrough of sufficient external heat to cause the setting of a heat-setting adhesive, intermediate thin layers of fibrous material being sometimes interposed between said plies and said heating plate, a heat-setting resin being introduced between the various joints of the resulting assembly, then uniting the assembly by applying external pressure and internal heat, said internal heat being produced by the passage of an electric current through said metallic conductor and being sufficient to produce the heat-setting of said adhesive in all of said joints; all as more fully hereinafter set forth and as claimed.

In a copending application, Serial No. 229,799, filed September 13, 1938, I have described a method of making reinforced laminated products and adhesive films therefor by the use of foraminous metallic reinforcing sheets which are coated with a heat-setting adhesive to produce a reinforced adhesive sheet and then this adhesive sheet is united to the plies to be joined by means of heat and pressure. In another copending application, Serial Number 229,798, filed September 13, 1938, in the names of Wolfgang Bäseler, Jakob Dietrich and myself, a method of making compound lumber with the use of heat-setting adhesives is described in which the heat required to produce setting of the adhesive is supplied by heating the described foraminous metallic reinforcing sheet by electricity, this method being described as being capable of use in the making of compound lumber from sheeted materials having considerable thickness owing to the fact that the heat which produces setting of the adhesive does not have to pass through the plies. The present invention represents an important improvement over the inventions described in these prior applications.

I have found that when it is attempted to unite plies of considerable thickness with the use of reinforced adhesive sheets and internal heating, as described above, certain difficulties are involved. Even when thin veneers are to be united by said adhesive sheet it is difficult to obtain a firm union between the plies owing to the fact that the foraminous metal tends to hold the plies apart. It is necessary to avoid direct metal-to-wood contact since the occurrence of such contacts in the joint results in a considerable weakening of the bond. This means that all metal surfaces must be coated with adhesive and even when this is done it is difficult to prevent the adhesive from squeezing out of the joint and to free the metal surfaces from the adhesive. The difficulties involved in obtaining tight joints are greatly increased when thick plies are to be united. The thick plies act as cushions and substantially prevent the deformation of the wood at the joint which is required to produce firm bonds. In the final joint the veneers are separated by relatively thick layers of adhesive which results in a weak joint.

I have found that the above described difficulties in the uniting of thick plies can be overcome in a very simple manner. It is only necessary to first manufacture a heating plate by assembling a foraminous metal conductor between thin plies of material with a heat-setting adhesive between the joints, followed by the application of heat and extreme pressures of the order of about 3500 pounds per square inch for example. With the use of such pressure thin veneers can be readily united with the production of joints substantially as strong as the wood itself. The metal conductor becomes substantially embedded in the adjoining plies. The wood of the plies is forced through the openings in the metallic conductor until a substantially wood-to-wood contact is formed, the plies being separated by a thin film of adhesive only. This produces an interlocking engagement which contributes to the strength of the finished article. Heating to produce setting of the adhesive can be accomplished either by the use of a press provided with heated platens or by heating the metal conductor electrically, thereby generating heat in the joint itself. This procedure produces a laminated heating plate which can then be assembled between thick sheets of material to be joined, a heat-setting adhesive being introduced into the joints and the whole assembly being placed under pressure while the metal of the heating plate is heated electrically. The internally generated heat readily passes through the thin veneers of the heating plate and produces setting of the adhesive on either side. Setting temperatures are obtained very quickly and hence there is little tendency for the adhesive to be forced from the joints by the pressure. Even thick sheets of material can be united in this manner with the production of joints having substantially the strength of the wood itself. The pressures employed in the final step may depend upon the hardness of the sheets to be united in such a manner that for a hard material a higher pressure is used than for a softer material.

When very thick compressed wood articles are to be united with the use of high pressures I have found advisable not to glue the compressed articles directly on the interposed heating plate or insert but to introduce thin and soft plies or veneers on both sides of the heating plate, that is, between the thick plies and the heating plate. These thin plies then act as so-called compensating plates tending to equalize the pressure. A heat-setting adhesive is, of course, introduced in all of the joints prior to the final step in which the assembly is united by means of heat and pressure. The pressure equalizing plies employed should be relatively thin, usually having a thickness not substantially exceeding $\frac{1}{16}$ inch, for example, since the heat from the metallic reinforcement in the heating plate must pass through these equalizing plies in order to reach the adhesive in the outer joints of the assembly. The finished article produced in this manner comprises an inner metallic conductor united on both sides, by means of a heat-set adhesive, with thin plies, this assembly forming the original heating plate. This heating plate is united, in the finished article, on both sides by means of a heat-set adhesive with the described thin pressure equalizing plies. And these latter plies are united on both sides by means of a heat-set adhesive with the thick compressed outer articles.

Various materials can be employed in making the compound lumber of the present invention, this term including combined paper board and laminated articles of other fibrous materials as well as plywood, compressed wood articles and the like. The heat setting adhesives employed may be of various types. These include solutions of heat-setting gums and the like. But I have obtained best results with the heat-setting artificial resins, such as the phenol-formaldehyde resins, the urea-formaldehyde resins, etc. I prefer to employ the alkaline condensation product of phenol-formaldehyde in its initial stage of condensation. This can be produced by the methods described in the patents to Weber et al., Nos. 1,960,176 and 1,960,177 for example. It is also possible to employ the solutions of phenol-formaldehyde resins in various organic solvents which are sold on the market as Bakelite varnishes. Various inert filling materials may be added to the adhesive if desired.

The metallic conductor which forms part of the heating plate of my invention may be pre-coated with the adhesives by spraying, brushing or dipping operations and then dried to a non-tacky state, if desired. It is also possible to use the adhesive in sheet form if desired. One convenient sheet form is described in the acknowledged patents of Weber et al. in which a carrier sheet of porous tissue paper is impregnated with a phenol-formaldehyde resin. The same adhesive can be used for making the heating plate and for uniting the heating plate with the other elements of the compound lumber or different adhesives may be used. When the metallic conductor is not pre-coated, various methods may be used within the skill of the art to apply the adhesive to the conductor and to the thin plies with which it is united to produce my heating plate.

If desired the metal reinforced sheeted adhesive, which is described in my acknowledged copending application, Serial No. 229,799, can be used in making my heating plate. The metal reinforcement may be a wire screen, a wire gauge or a network or band of wires arranged in sinuous shape, for example, or it may be a perforated metal plate. When a metal plate is used, inductive heating can be employed, the work being surrounded by a high-frequency induction coil. When the reinforcement is constructed of wire, resistance heating may be employed, a direct or alternating current being passed through the wires. The temperature produced in the joint can be closely controlled by both methods. The metal reinforcement may be constructed of various materials. Iron and steel are, of course, the cheapest but nichrome, chromel or other high resistance alloys can be employed if desired.

When a phenol-formaldehyde resin is employed as an adhesive, it should be heated to a temperature of about 130° C. or higher in order to produce final setting. In the production of the heating plate of my invention it is not necessary that complete setting of the adhesive take place since the adhesive used in making this plate is again heated when the plate is united with additional plies of material. While no particular injury to the set adhesive results from reheating it to setting temperatures it is true that somewhat stronger joints are produced between the metal reinforcement and the adjoining thin plies provided that the temperature employed in making the heating plate is maintained slightly below that employed in the final heating step wherein the heating plate is united with additional plies of material. Temperatures ranging between about 120 to 130° C. can be employed in making the heating plate, for example.

Several important advantages are gained by the use of the present invention. Thus, it is possible to make compound lumber from heavy parts as readily as from thin parts. For example, thick planks can be united to form I-beams as readily and quickly as it was formerly possible to unite thin veneers in the production of ply-wood. It is also possible by the use of the present method to unite a large number of plies simultaneously, a result which was impossible with prior methods. Heated platens are not required in the present method, hence cheaper presses may be employed. No difficulties are involved in uniting plies which contain a considerable moisture content for the reason that the moisture is driven away from the joint rather than towards it, as in the case of making compound lumber with the use of external heating. My method is characterized by the quickness with which thick parts can be united. Since the adhesive to be set by heat is separated from the heating element only by the thin veneers of the heating plate, setting temperatures are reached at least as quickly as in the ply-wood press operating with heated platens. The heating period is usually shorter in my process for the reason that the foraminous metallic conductor has a very low heat capacity and can be brought to temperature much quicker than the usual press platens, for example. It is possible to speed up the rate of heating by varying the electrical conditions in such fashion that the heat generated in the conductor is greater at the start of the heating step than towards the end of this step. Such a procedure cannot be employed effectively when heated platens are used owing to the high heat capacity of the platens. It is also possible in my method to vary the heat from point to point in the joint. This can be accomplished by varying the spacing or the cross section of the metallic conductor. It is therefore evident that much closed control of the heating step is possible in the present process.

My method is particularly applicable for use in making articles, such as gear wheels, in which high stresses are produced. In the making of such articles the metallic conductor of the heating plate may be provided with reinforcing ridges or elements adapted to resist the various stresses which may be set up in the articles, these reinforcing elements being keyed into the plies during the heat and pressure step.

My invention can be described in somewhat greater detail by reference to the accompanying drawing which shows, more or less diagrammatically, embodiments of my heating plate and of finished laminated articles produced by the method of the present invention. In this showing:

Fig. 1 is a cross section through a portion of my heating plate, showing its internal construction, Fig. 2 is a similar cross section through a laminated article in which two thick plies are united to a central heating plate, and Fig. 3 is a similar cross section through a laminated article in which a central heating plate is united with pressure equalizing plates on both sides and to the outer parts of considerable thickness.

The various figures of the drawing are supplied with appropriate legends which are believed to be self-explanatory. The heating plate of Fig. 1 is shown with a central, foraminous metallic conductor which, as stated previously, may be a perforated metal plate, a wire screen, a network of wires or the like. The perforated metal plate shown in this figure is provided with reinforcing ridges which are keyed into the thin wooden plies on both sides. These plies are deformed to such an extent that the conductor is practically embedded in the plies, the plies being pressed into substantial contact through the openings in the conductor, leaving only a thin film of adhesive.

In Fig. 2 the various plies are of fibrous material, the central heating plate being united on both sides with thicker plies of fibrous material by means of a thin film of adhesive.

In Fig. 3 the central heating plate is united on both sides to pressure equalizing plates formed of thin wooden veneers, these equalizing plates being united on both sides to thick wooden parts. While I have described what I consider to be the best embodiments of this invention, it is evident that many variations can be made in the various specific details which have been disclosed. It is obvious, of course, that various assemblages of plies of varying thickness may be united to form composite articles within the present invention.

A plurality of the heating plates can be used if this is required. The more heating plates employed, the stronger the finished article, since the metallic conductors serve effectively as reinforcing elements. While this invention can be employed in the manufacture of ply-wood in which at least three layers of wood are present, it is particularly adapted to the production of laminated articles from heavy or thick parts. As stated previously, my method is capable of uniting such parts as cheaply and satisfactorily and with the same rapidity of production as previous methods were capable of uniting thin veneers. Modifications of my method which would be evident to those skilled in the art and which fall within the scope of the following claims, I consider to be within my invention.

What I claim is:

1. In the manufacture of compound lumber, the process which comprises assembling a thin foraminous metallic conductor between thin plies of fibrous material, a heat-setting adhesive being introduced between said conductor and said plies, heating said adhesive to temperatures sufficiently high to produce substantial setting of said adhesive while subjecting the assembly to pressures sufficiently high to force the material of said plies through the openings of said conductor into substantial contact, then placing the resulting heating plate between plies of material to be united, at least one of said plies being too thick to permit the conduction of sufficient heat therethrough to cause the setting of a heat-setting adhesive, a heat-setting adhesive being present in the joints between said heating plate and said thick plies, and applying pressure to the resulting assembly while heating said adhesive to setting temperatures by passing an electric current through said metallic conductor, said thin plies of said heating plate being sufficiently thin to permit the ready passage therethrough of the electrically generated heat sufficient to produce the setting of said adhesive introduced into the joints between said heating plate and said thick plies.

2. The process of claim 1 wherein the adhesive employed is the initial condensation product of phenol and formaldehyde and wherein the temperature employed in the making of said heating plate and the temperature employed in the final heating step correspond to the setting temperature of the condensation product.

3. In the manufacture of compound lumber, the process which comprises making a heating plate by placing a thin foraminous metallic conductor between thin plies of wood, a heat-setting adhesive being present between said plies and said metallic conductor, uniting said plies with said metallic conductor by the application of heat and pressure, then placing the resulting heating plate between plies of wood at least one of which is too thick to permit passage therethrough of sufficient heat to cause the setting of a heat-setting adhesive, a heat-setting adhesive being present in the joints of the resulting assembly, then uniting said assembly by applying external pressure and internal heat, said internal heat being produced by passing an electric current through said metallic conductor, said thin plies of said heating plate being sufficiently thin to permit the ready passage therethrough of the electrically generated heat sufficient to produce the setting of said adhesive introduced into the joints between said heating plate and said thick plies.

4. In the manufacture of compound lumber, the process which comprises making a heating plate by placing a thin foraminous metallic conductor between thin plies of fibrous material, a heat-setting adhesive being present between said conductor and said plies, uniting said sheets with said metallic conductor by the application of heat and pressure sufficient to force said plies through the perforations of said metallic conductor into substantial contact, then placing the resulting heating plate between thick plies of fibrous material having a thickness too great to permit passage therethrough of sufficient heat to cause the setting of said adhesive, thin pressure-compensating sheets of fibrous material being interposed between said heating plate and said thick plies, a heat-setting adhesive being present in the joints of the resulting assembly, then uniting said assembly by the application of internal heat and external pressure, said internal heat being supplied by passing an electric current through said metallic conductor, said thin plies of said heating plate being sufficiently thin to permit the ready passage therethrough of the electrically generated heat sufficient to produce the setting of said adhesive introduced into the joints between said heating plate and said thick plies.

5. Compound lumber comprising an inner heating plate formed of a thin foraminous metallic conductor, capable of being heated electrically, united by means of a heat-set adhesive to thin plies of fibrous material, the material of said plies being in substantial contact through the openings of said foraminous conductor, said inner heating plate being united by means of a heat-set adhesive with thick outer plies of fibrous material.

6. Compound lumber comprising an inner heating plate formed of a thin foraminous metallic conductor, capable of being heated electrically, united by means of heat-set adhesive to thin plies of fibrous material, the material of said plies being in substantial contact through the openings of said foraminous conductor, said heating plate being united by means of a heat-set adhesive to intermediate thin pressure-compensating plies of fibrous material, said pressure-compensating plies being united by means of a heat-set adhesive to outer thick plies of fibrous material having a thickness too great to permit the passage of sufficient heat therethrough to produce the setting of a heat-setting adhesive.

7. In the manufacture of compound lumber from parts too thick to permit the conduction therethrough of sufficient heat to cause the setting of a heat-setting adhesive, the process which comprises interposing between said parts a heating plate, consisting of an internal foraminous metallic conductor embedded in and united to thin plies of fibrous material, a heat-setting adhesive being present in the joints between said thick parts and said heating plate, then subjecting the assembly to high pressures while passing an electric current through said metallic conductor and thus generating sufficient heat to pass through said thin plies and to cause the heat-setting of said adhesive.

WILLY LÜTY.